United States Patent [19]
Lott

[11] Patent Number: 4,841,566
[45] Date of Patent: Jun. 20, 1989

[54] HOLD AND DIAL ACCESSORY FOR TELEPHONE INSTRUMENT

[76] Inventor: Thomas M. Lott, 55 W. Santa Inez, San Mateo, Calif. 94402

[21] Appl. No.: 158,867

[22] Filed: Feb. 22, 1988

[51] Int. Cl.⁴ .............................................. H04M 1/26
[52] U.S. Cl. .................................... 379/352; 379/387; 379/393
[58] Field of Search ............... 376/162, 387, 388, 393, 376/391, 354, 355, 352

[56] References Cited

U.S. PATENT DOCUMENTS

| | | | |
|---|---|---|---|
| 4,475,013 | 10/1984 | Lee et al. | 379/355 |
| 4,496,799 | 1/1985 | Kingen et al. | 379/388 X |
| 4,529,843 | 7/1985 | Boeckmann | 379/393 |

*Primary Examiner*—James L. Dwyer
*Attorney, Agent, or Firm*—David B. Harrison

[57] ABSTRACT

A hold and dial monitor accessory is provided for use with a conventional telephone instrument connected across a subscriber service pair extending from a central office. The hold and dial monitor accessory is bridge connected across the telephone service pair and includes a manually actuable and releasable line seize switching circuit for controlling a line hold circuit connectable across a communications loop through the central office. The line seize switching circuit has an internally established time constant for automatic line release whenever a telephone handset is taken off-hook, and an audio amplifier and loudspeaking circuit is provided for amplifying audio information present on the telephone service pair during the interval when the line hold circuit is holding the communications loop.

8 Claims, 2 Drawing Sheets

4,841,566

HOLD AND DIAL ACCESSORY FOR TELEPHONE INSTRUMENT

FIELD OF THE INVENTION

The present invention relates to telephone accessory equipment. More particularly, the present invention relates to a hold and dial circuit accessory for attachment across a telephone line to facilitate hands free dialing of a telephone number with a conventional telephone instrument, whether it be rotary dial or DTMF signalling.

BACKGROUND OF THE INVENTION

Some modern telephone instruments combine the dialing mechanism into the handset, while in others the dialing mechanism or circuit is still in the body of the instrument itself. In placing a call, typically the telephone handset is lifted off of its cradle and held in one hand while the other hand is used to rotate a rotary dial or to depress buttons in a sequence corresponding to the desired number to be reached. Once dialing is completed, the handset is held next to the ear until the call is satisfactorily completed or the dial up effort is abandoned. Often, a call is not completed as when the called party is away, or may be unsatisfactorily completed as to an incorrect number or to an answering machine. Telephone service lines extending from a central office to a subscriber's premises typically provide +48 volts across the tip and ring wire pair thereof whenever the telephone instrument is not in service or is "on hook" or hung up in its cradle. When a telephone instrument is taken off of its cradle or enters an "off hook" condition, a low impedance condition is placed across the tip and ring wire pair, and the central office equipment senses this condition and establishes communications path enabling the telephone instrument to send sequence of pulses or tones corresponding to a telephone number to be reached. During the dialing sequence, electrical transients are typically present across the tip and ring wire pair, and these transients may interfere with conventional hold circuitry which may otherwise be incorporated into the telephone instrument.

Conventionally, hold circuits have employed relays or silicon controlled rectifiers (SCR's) to bridge a low impedance load across the telephone tip and ring wire pair during instances when the telephone instrument is placed back on hook, thus placing the communications path to which the instrument is connected "on hold". Such circuits may also include visual annunciators such as a flashing light to signal the "hold" condition. However, such circuits have not been intended for use nor have they been effective for use during a dial up sequence to enable hands free monitoring of the dial up process.

Telephone instruments incorporating microphones and loudspeakers, called "speakerphones", have enabled hands free monitoring of the dial up process. However, speakerphones are special instruments integrally incorporating the microphone and loudspeaker, or they are expensive accessory units which require suitable external power supplies and special connections to the telephone instrument.

A hitherto unsolved need has arisen for a low cost hold and dial accessory which may be connected to the telephone instrument without modification thereof and which enables hands free monitoring of a call in progress without need for keeping the telephone instrument next to the ear throughout the dial up sequence.

SUMMARY OF THE INVENTION WITH OBJECTS

A general object of the present invention is to provide a low cost hold and dial accessory for a telephone instrument which overcomes the limitations and drawbacks of the prior art.

A hold and dial monitor accessory in accordance with the principles of the present invention is provided for convenient use with a conventional telephone instrument connected across a subscriber service pair extending from a central office. The hold and dial monitor accessory is bridge connected across the telephone service pair and includes a manually actuable and releasable line seize switching circuit and a line hold/-power supply circuit for holding a communications loop through the central office. Preferably the line seize switching circuit includes an internally established time constant for automatic release of the line hold circuit, and an audio amplifier and loudspeaking circuit for amplifying audio information present on the telephone service pair during the interval when the line hold circuit is holding the communications loop.

In one aspect of the present invention, the line seize switching circuit, line hold circuit and the audio amplifier and loudspeaking circuit obtain operating power from the central office via the telephone service pair. An electronic power switching circuit included within the line hold circuit is connected across the telephone service pair and selectively applies operating power through the audio amplifier and loudspeaking circuit as an adjunct of its primary function of holding the communications loop.

In a further aspect of the present invention, the electronic power switching circuit comprises a field effect transistor having its source and drain connected in a series path with the audio amplifier and loudspeaking circuit and having its gate circuit responsive to the high impedance line seize switching circuit.

In another aspect of the present invention a zener diode is connected in series with the field effect transistor and a feedback connection is made to the line seize switching circuit so that once the line seize switching circuit has caused the line hold circuit to hold the communications loop, such holding continues until such time as the telephone instrument connected across the telephone subscriber pair is taken off hook, whereupon the internally established time constant of the line seize switching circuit commences to time out holding of the communications loop by the line hold circuit.

In yet another aspect of the present invention a bridge rectifier is connected across the telephone service pair in order to render the accessory insensitive to connection sense of tip and ring wire order of the telephone service pair.

In one more aspect of the present invention, the line seize switching circuit comprises an enhancement mode N channel field effect transistor having its source and drain elements in series connection with a resistor across the tip and ring wires of the telephone service pair and a gate connection selectively connectable to one of the tip and ring wires in order to switch a low impedance of the hold circuit across the tip and ring wires and thereafter selectively connectable to the other of the tip and ring wires in order to release the low impedance hold circuit, there also being a charge storage capacitor and a discharge resistor connected between the gate and the other of the tip and ring wires in order to establish the internally established time constant.

These and other objects, advantages, features and aspects of the present invention will be more fully understood and appreciated by those skilled in the art upon consideration of the following detailed description of a preferred embodiment, presented in conjunction with the accompanying drawing.

DETAILED DESCRIPTION OF A PREFERRED EMBODIMENT

Figure 1:
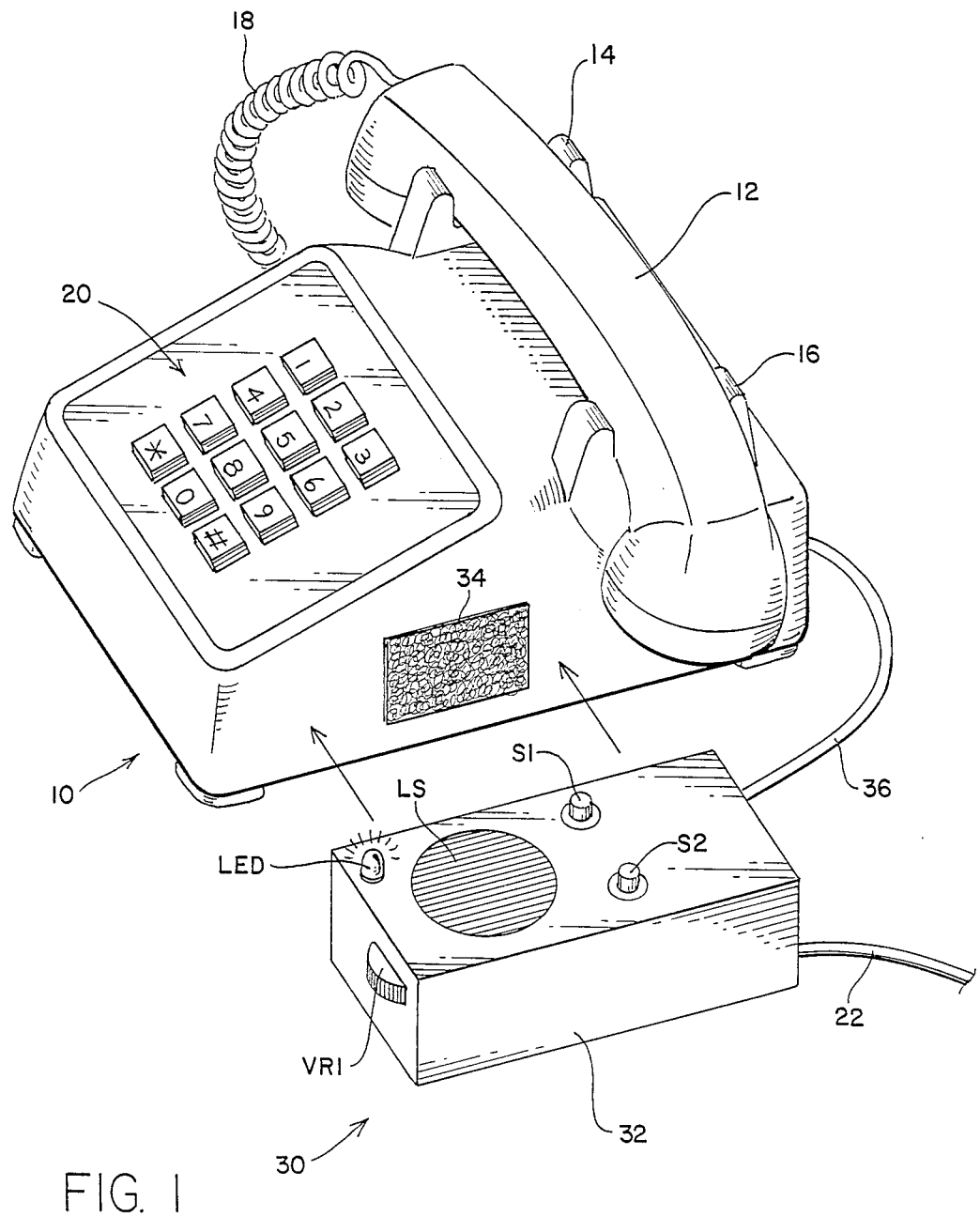
FIG. 1 depicts a somewhat diagrammatic, isometric view of a hold and dial monitor accessory in accordance with the principles of the present invention.

With reference to FIG. 1 a conventional telephone instrument includes a body 10 and a handset 12 containing a transmitter and receiver cradled in a suitable cradle formed by generally U-shaped posts 14 and 16 and connected to the body by a coiled cable 18. A conventional dual tone multi-frequency (DTMF) key pad 20 is included in the body 10, and it is used to generate DTMF signalling tones used for dialing telephone numbers. A rotary dial telephone instrument may be used with the present invention with equal satisfaction as the illustrated DTMF instrument.

A modular receptacle (not shown) is provided conventionally in the back of the telephone instrument for conventional connection to the telephone tip and ring line pair extending from the central office (not shown).

In accordance with the principles of the present invention, a hold and dial monitor accessory 30 includes a suitable small box-like housing 32, preferably formed of plastic material which has been colored and styled to match the includes a suitable plastic loop fastener pad (not seen in FIG. 1) which mates with a felt pad 34 affixed to a side of the telephone instrument body 10 (typically referred to under the trademark VELCRO). In FIG. 1, the accessory 30 is shown separated from the instrument body 10 for purposes of illustration. In practice, the accessory 30 is physically connected to the body 10 via the fastener pad and felt pad 34. A short connector cable 36 extends from the accessory 30 to the modular receptacle of the instrument body 10, and the line cord 22 plugs into a modular receptacle formed in th back wall of the accessory housing 32.

Several elements of the accessory 30 are manifested at the top of the housing 32. These include a grill for a loudspeaker LS, a "hold" momentary contact pushbutton switch S1, a release or cancel pushbutton switch S2, and an indicator lamp LED. A loudness control VR1 mounted in e.g. the front panel of the housing 32 enables adjustment of loudness.

Figure 2:
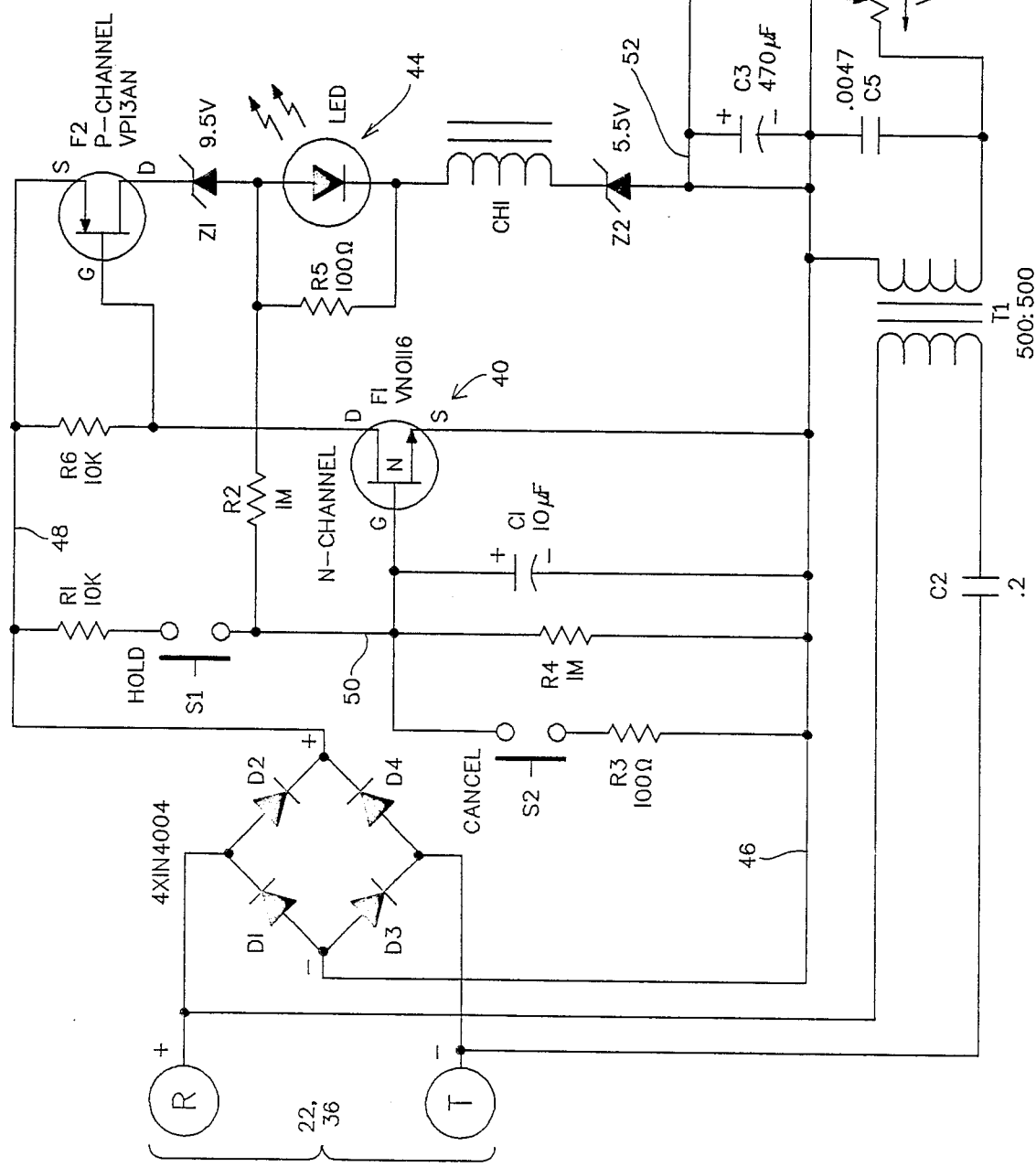
FIG. 2 is a schematic circuit diagram of a hold and dial monitor accessory in accordance with the principles of the present invention.

With reference to FIG. 2 the accessory 30 includes essentially three different circuits, a line seize switching circuit 40, an audio amplifier and loudspeaker circuit 42, and a low impedance providing hold circuit 44. Advantageously, the hold circuit 44 also switches and regulates operating power taken from the tip and ring wire loop through the central office in order to supply such power the audio amplifier and loudspeaker circuit 42.

The line seize switching circuit 40 includes an enhancement mode N channel field effect transistor F1 having a source connected to the tip wire or minus line 46, and a drain connection connected through a 10K ohm resistor R6 to the ring wire or plus line 48, of the line pair 22 (the diode bridge of insensitive to inadvertent polarity reversal between tip and ring wire orientation.

The gate of the transistor F1 is connected to a node 50 including (1) the hold switch S1 which is in turn connected through a 10K ohm resistor R1 to the plus line 48; (2) a large value electrolytic capacitor C1 connected to the minus line 46; (3) a high value discharge resistor R4 connected across the capacitor C1 to establish a time constant of about 3 seconds; and (4) the cancel pushbutton switch S2 connected through a 100 ohm resistor R3 to the minus line 46.

The audio amplifier and loudspeaker circuit 42 includes an isolation transformer T1 having a primary connected to the ring wire and to the tip wire through a series blocking capacitor C2. The secondary winding is bridged by a capacitor C5 and by a variable resistor VR1 having a wiper lead connected to an input of a low power audio amplifier integrated circuit, such as type LM 368 manufactured by National Semiconductor, or equivalent. The wiper sets the loudness level of the amplifier circuit 42. The loudspeaker is connected to an output node of the amplifier circuit through a blocking capacitor C4.

Line holding is provided by the hold circuit 44. Also, operating power is selectively applied through the amplifier circuit 42 via the hold circuit 44. This circuit includes a P channel enhancement mode field effect transistor F2 having a source connected to the plus line 48. The drain of the transistor F2 is connected to a 9.5 volt zener diode Z1 which is in turn connected to the node 50 via a high value resistor R2 and to the indicator lamp LED. The lamp LED is bridged by a small value resistor R5 and is series connected to a choke CH1 which prevents a filter capacitor C3 from bypassing the line audio signal on the plus line 49 directly to the minus line 46.

The choke CH1 is connected to a plus 5.5 volt supply node 52 leading through the integrated circuit amplifier. A 5.5 volt zener diode Z2 and the filter capacitor C3 are connected between the supply node 52 and the minus line 46 to provide regulated and filtered 5.5 volts operating potential to the integrated circuit amplifier.

When the accessory 30 is connected to the telephone instrument as shown in FIG. 1, and the handset 12 is "on hook" as shown in FIG. 1 with the handset 12 in its cradle 14, 16, a DC voltage of approximately 46 volts is developed across the lines 42, 46 at the output of the D1–D4 bridge. When the switch S1 is momentarily depressed, a positive voltage is applied to the gate of the transistor F1 causing it to conduct. When the transistor F1 conducts, its drain essentially approaches the potential of the negative line 46.

Since the gate of the transistor F2 is connected to the drain of the transistor F1, when the drain connection of the transistor F1 approaches the potential of the minus line 46, the transistor F2 also conducts, causing the line to be held and power to be applied to the audio amplifier and loudspeaker circuit 42. The relatively low impedance causes a communications loop to be established by operation of line finder circuitry of the central office.

Since the series path of the power switch 44 is fed back to the gate circuit node 50 of the transistor F1 through the resistor R2, when the transistor F2 conducts, a latching voltage is fed back to the gate 50, and the transistor F1 remains in a conductive state which, in turn, holds the transistor F2 in a conductive state. In this state, the capacitor C1 rapidly charges to the potential at the node 50 and remains charged at that voltage despite the presence of the high value discharge resistor R4.

The line seize switching circuit 40 will cause the line hold circuit 44 to remain latched until the telephone handset 12 is removed from its cradle and a much lower impedance thereby becomes placed across the tip and ring wires of the line 22. This same situation obtains when the handset of any other telephone connected to the line 22 goes off hook. When a handset goes off hook, the telephone line voltage thereupon becomes reduced to between 5 and 9 volts. Since this voltage is below the voltage rating of the zener Z1, it will no longer continue to conduct, and the latching voltage being fed back to the gate node 50 thereupon ceases. At this point, the voltage stored in the capacitor C1 begins to discharge through the resistor R4. The C1-R4 network has a time constant of about 3 seconds, meaning that after about 3 seconds, the transistor F1 ceases to conduct. When the transistor F1 ceases to conduct, the transistor F2 also ceases to conduct, and the line hold circuit 44 thereupon releases the communications loop through the central office.

The hold circuit 44 may also be released instantly by depressing the release or cancel switch S2 which forces the gate of transistor F1 to the potential of the negative line 46, thereby causing the transistor F2 to cease to conduct.

The audio signal on the line 22 is fed to the LM386 amplifier circuit via the capacitor C2 and transformer T1 and reproduced at the loudspeaker LS at a level adjusted by operation of the variable resistor VR1. The loudspeaker is decoupled from the supply voltage of the integrated circuit amplifier on the line 52 by the DC blocking capacitor C4.

To use the accessory 30, the hold button S1 is momentarily depressed, and a dial tone should be heard from the loudspeaker LS. Once dial tone is perceived, the handset is picked up and placed in any convenient position to enable dialing (some handsets have the rotary dial or DTMF pad built into the handset). Since the capacitor C1 begins to release once the handset 12 is taken off hook, the accessory 30 quickly disconnects itself from the line, and will be disconnected before the end of the dialing sequence.

Once dialing is completed, the hold button S1 is again depressed, recharging the capacitor C1, and the handset 12 is returned to its cradle 14, 16, before the end of the three second discharge time of C1. The hold circuit is thus activated and the line activity following dialing will then be annunciated through the loudspeaker LS at a level determined by the setting of the volume control VR1.

If the called party line is busy, the busy signal will be heard via the loudspeaker, and the dial up sequence may be terminated by depressing the release button S2. If the ringing continues with no reply, the sequence may also be terminated by depressing the release button S2. If a recorded message of an answering machine is annunciated via the loudspeaker, the calling party is free to pick up the handset 12 if instructed to leave a message, or stay listening to the line until an individual answers the called party telephone at which time the calling party picks up the handset 12. If the called party picks up the handset, then the calling party picks up the handset 12 and engages in using the telephone instrument 10 in conventional fashion. In all these last three cases the call is completed by returning the handset 12 to its cradle 14, 16.

Thus, it will be apparent that the accessory 30 enables the calling party to engage in hands-free dialing and monitoring of the call in progress without need to hold the handset next to the ear. Once the called party is satisfactorily reached, the accessory 30 quickly disconnects from the line 22 and remains inert during continued use of the telephone throughout the remainder of the call.

To those skilled in the art, many widely differing implementations and embodiments of this invention will be suggested from the foregoing description illustrative of a presently preferred embodiment thereof. Nothing herein is intended to be limiting of the scope of the present invention which is more particularly defined by the following claims.

I claim.

1. A hold and dial monitor accessory for use with a conventional telephone instrument connected across a subscriber service pair extending from a central office, the hold and dial monitor accessory being bridge connected across the telephone service pair and including manually actuable and releasable line seize circuit means for holding a communication loop through the central office and having an internally established time constant for automatic line release, and audio amplifier and loudspeaking circuit means for amplifying audio information present on the telephone service pair during the interval when the line seize circuit means is holding the communication loop, the line seize circuit means comprising an enhancement mode field effect transistor having source and drain elements in series connection across the tip and ring wires of said telephone service pair and a gate connection selectively connectable to one of the tip and ring wires in order to place a low impedance load across the tip and ring wires and thereafter selectively connectable to the other of the tip and ring wires in order to release the low impedance load, there being charge storage capacitor and discharge resistor means connected between the gate and the other of the tip and ring wires in order to establish said internally established time constant.

2. The hold and dial monitor accessory set forth in claim 1 wherein said line seize switching circuit means, line hold circuit means and audio amplifier and loudspeaking circuit means obtain operating power from the central office via the telephone service pair.

3. A hold and dial monitor accessory for use with a conventional telephone instrument connected across a subscriber service pair extending from a central office, the hold and dial monitor accessory being bridge connected across the telephone service pair and including manually actuable and releasable line seize circuit means for seizing and holding a communication loop through the central office and having an internally established time constant for automatic line release, audio amplifier and loudspeaking circuit means for amplifying audio information present on the telephone service pair during the interval when the line seize circuit means is holding the communications loop, and electronic power switching means connected across said telephone service pair for selectively applying operating power to said audio amplifier and loudspeaking circuit means during the interval when the line seize circuit is holding the communications loop, said line seize circuit means comprising a field effect transistor having its source and drain connected in a series path with audio choke means and said audio amplifier and loudspeaking circuit means and having a gate circuit responsive to the line seize circuit means.

4. The hold and dial monitor accessory set forth in claim 4 further comprising zener diode means connected in series with said field effect transistor and a feedback connection to said line seize switching circuit means, so that once said line hold circuit means has commenced holding the communications loop, the holding thereof continues until such time as a said telephone instrument connected across said telephone subscriber pair is taken off hook whereupon said internally established time constant of said line seize switching circuit means commences to time out holding of the communications loop by the line hold circuit means.

5. The hold and dial monitor accessory set forth in claim 2 further comprising bridge rectifier means connected across said telephone service pair in order to render said accessory insensitive to connection sense of tip and ring wire order of said pair.

6. A hold and dial monitor accessory for use with a conventional telephone instrument connected across a subscriber service pair extending from a central office, the hold and dial monitor accessory being bridge connected across the telephone service pair and including manually actuable and releasable line seize switching circuit means and line hold circuit means for holding a communications loop through the central office, said line seize switching circuit means for controlling operation of said line hold circuit means and having an internally established time constant for causing automatic line release, said line seize switching circuit means including a first field effect transistor having source and drain elements in series with a resistor connected across the tip and ring wires of said telephone service pair and a gate connection selectively connectable to one of the tip and ring wires in order to place said line hold circuit means across the tip and ring wires and thereafter selectively connectable to the other of the tip and ring wires in order to release the line hold circuit means, there being charge storage capacitor means and discharge resistor means connected between the gate and the other of the tip and ring wires in order to establish said internally established time constant, audio amplifier and loudspeaking circuit means connected to the telephone service pair for amplifying audio information present on the telephone service pair during the interval when the line seize circuit is holding the communications loop and, wherein said line hold circuit means includes power supply means for obtaining operating power for said accessory via the communications loop through the central office, said power supply means including electronic power switching means connected across said telephone service pair for selectively applying operating power to said audio amplifier and loudspeaking circuit means during the interval when the line hold circuit means is holding the communications loop, said electronic power switching means comprising a second field effect transistor having its source and drain connected in a series path audio choke means and with said audio amplifier and loudspeaking circuit means and having a gate circuit connected to the drain of the first field effect transistor and zener diode means connected in series with the drain of said field effect transistor and a feedback connection from the zener diode to the gate of said first field effect transistor, so that once said line seize switching circuit means has caused the line hold circuit means to hold the communications loop, holding continues until such time as a said telephone instrument connected across said telephone subscriber pair is taken off hook whereupon said capacitor of said line seize switching circuit means commences to discharge thereby to time out holding of the communications loop by the line seize circuit means.

7. The hold and dial monitor accessory set forth in claim 6 wherein said power supply means includes bridge rectifier means connected across said telephone service pair in order to render said accessory insensitive to connection sense of tip and ring wire order of said pair.

8. The hold and dial monitor accessory set forth in claim 6 wherein said first field effect transistor is an enhancement mode, N channel transistor; and wherein said second field effect transistor is an enhancement mode, P channel transistor.

* * * * *